US005132789A

United States Patent [19]

Ammon et al.

[11] Patent Number: 5,132,789

[45] Date of Patent: Jul. 21, 1992

[54] TILT RACK VIDEO TAPE LIBRARY AND VCP TO MULTIPLE SUBSCRIBER SYSTEM

[75] Inventors: John P. Ammon, Dallas; William B. Stuhler; John A. Palmer, both of Plano, all of Tex.

[73] Assignee: Tiltrac Corporation, Carrollton, Tex.

[21] Appl. No.: 441,967

[22] Filed: Nov. 28, 1989

Related U.S. Application Data

[63] Continuation-in-part of Ser. No. 144,328, Jan. 15, 1988.

[51] Int. Cl.[5] ........................ H04H 1/02; H04N 7/10; B65G 1/06

[52] U.S. Cl. ........................ 358/86; 455/5.1; 455/6.1; 414/273; 221/88

[58] Field of Search ........................ 455/4, 5, 6; 358/84, 358/86; 414/268, 270, 273, 286, 276-283, 661; 221/88, 126, 129

[56] References Cited

U.S. PATENT DOCUMENTS

| | | | |
|---|---|---|---|
| 3,750,804 | 9/1973 | Remelson | 414/278 |
| 4,734,005 | 3/1988 | Blumberg | 414/273 |
| 4,867,628 | 9/1989 | Ammon et al. | 414/273 |
| 4,890,320 | 12/1989 | Monglow et al. | 455/5 |

FOREIGN PATENT DOCUMENTS

| | | | |
|---|---|---|---|
| WO86/06050 | 10/1986 | European Pat. Off. | 414/273 |

*Primary Examiner*—Reinhard J. Eisenzopf
*Assistant Examiner*—Lisa Charouel
*Attorney, Agent, or Firm*—Warren H. Kintzinger

[57] ABSTRACT

A self contained tilt rack video cassette library cabinet containing multiple VCP units with an XYZ motion tape cassette selection and delivery system to computer directed insertion in a subscriber VCP and return after play to a tilt rack library storage bin. The system includes activation means, movie selection means and a TV set at each subscriber location, an address mechanism in the system and a telephone line connection through a duplex modem to a computer having a monitor and keyboard with computer controlling XYZ carrier movement pick up of cartridges from and return to video cassette storage bins, insertion and extraction of selected video cassettes to and from subscriber dedicated video cassette players (VCP). Each VCP has an audio and video output connection to respective modulators each output connected to a combiner mixer. There is also a character-modulator loop connection, and a computer to combiner mixer address transmitter loop along with a character generator modulator loop, with the mixer output connected to address control circuits.

23 Claims, 10 Drawing Sheets

Figure 1A:
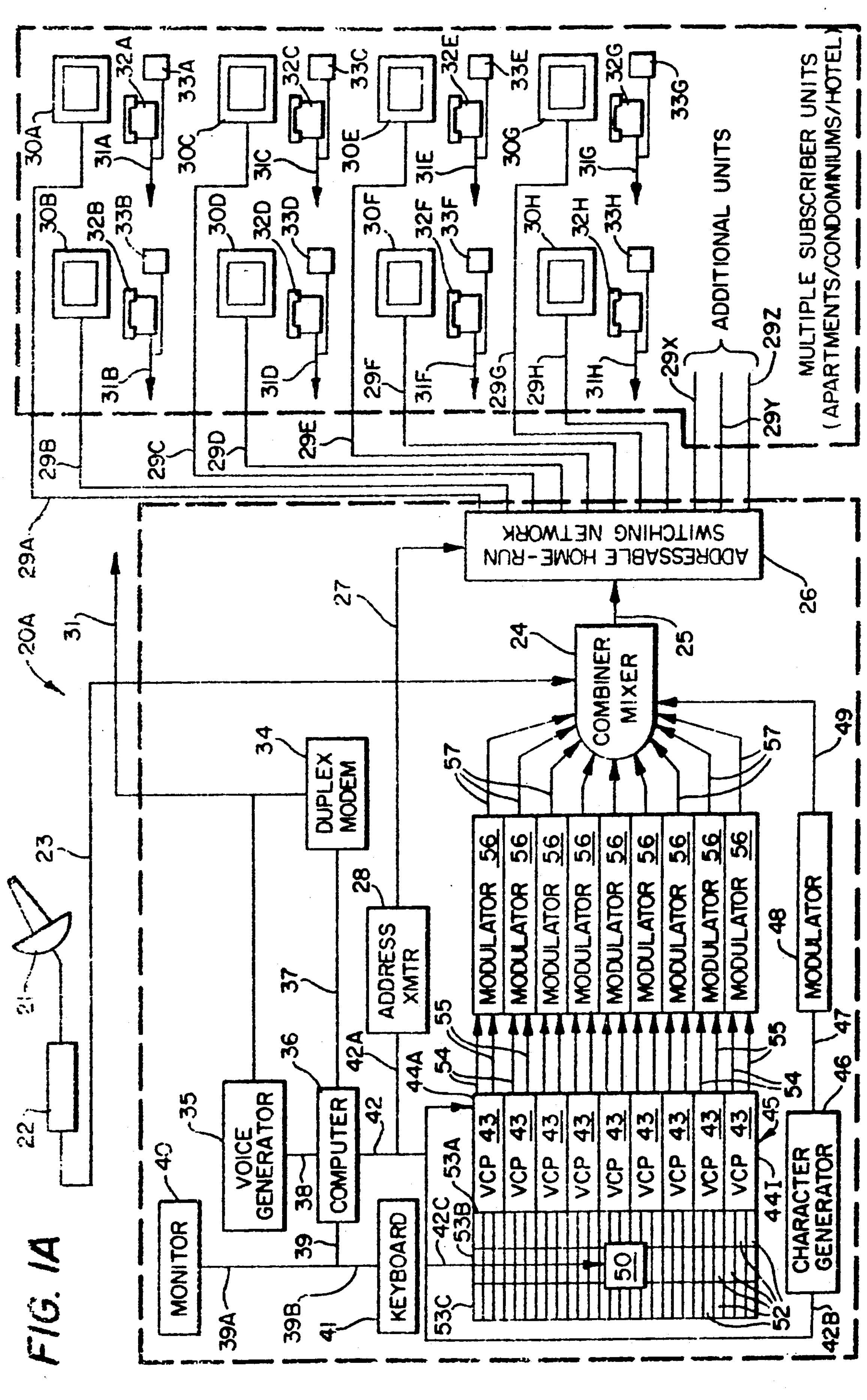

MONITOR
VOICE GENERATOR
COMPUTER
KEYBOARD
DUPLEX MODEM
ADDRESS XMTR
VCP 43
MODULATOR 56
MODULATOR
CHARACTER GENERATOR
COMBINER MIXER
ADDRESSABLE HOME-RUN SWITCHING NETWORK
ADDITIONAL UNITS
MULTIPLE SUBSCRIBER UNITS (APARTMENTS/CONDOMINIUMS/HOTEL)

81
82R
82L
61
79R
79L
105
62

65
64

70
75
72
76
43
69
71
70
72
73
66
67
64
65
69
71
60
73

66
67
43'
60

TILT RACK VIDEO TAPE LIBRARY AND VCP TO MULTIPLE SUBSCRIBER SYSTEM

This is a continuation-in-part of our copending application Ser. No. 07/144,328 filed Jan. 15, 1988 "Dispenser Storage System".

This invention relates in general to video cassette player to television player systems, and in particular, to a video cassette tilt bin library and video cassette cabinet in a tilt rack video cassette storage library and VCP to multiple subscriber system.

There are various systems and ways of supplying pay-per-view movies, or video cassettes for independent playing of movies and programs via video cassette players, for television in the home, apartment complex, hotel, motel, hospital and other locations. The advent of fiber optics and the ability to carry large amounts of information over a single strand enables various locations to receive cable television programming, switched video and telephone service over optic fiber. Such locations are capable of receiving a plurality of downstream switched video channels and upstream video channel switching. With this system and other cable systems, from the entertainment standpoint, it means that instead of going to the video rental store you could request a movie and it would be played down the line to you for a fee. A downstream switching system would in some systems also allow for video catalog shopping. Spectradyne is presently the nations largest provider of pay-per-view movies providing service at this time to more than 600,000 North American hotel guest rooms. Comsat Video Enterprises is also active in this market. Generally, however, these and other companies provide pay-per-view showings (various program choices at a time) according to their schedules rather than at the subscriber's convenience. Thus there is a need for a video cassette library system along with video cassette players computer controlled by transmitted signal inputs from a television set subscriber location. This provides for transport of a selected program (movie) cassette to a video cassette player for program transmission through a selected channel to a specific subscriber location.

It is therefore a principal object of this invention to provide a video cassette player (VCP) to television multiple subscriber system with a video cassette storage multi-bin library cabinet also containing a plurality of VCP's for dedicated use by subscribers at their time convenience.

Another object with such a VCP to television multiple subscriber system is to provide a tilt rack cabinet with multiple cassette storage bins served by a tape cassette selection, delivery and return system.

A further object with such a VCP to television multiple subscriber system is to eliminate rent out and dispensing of video cassettes to the general public.

Still another object is to provide a protective environment for video cassettes with cassette movement from tilt rack bin storage to a VCP and return to bin storage after play by a computer controlled XYZ transport structure.

Features of the invention useful in accomplishing the above objectives include, in a tilt rack video tape cassette library and VCP to multiple subscriber television play system, a tilt rack video cassette library containment cabinet containing multiple VCP units with an XYZ motion tape cassette selection and delivery system to computer directed insertion in a subscriber VCP and return after play to a tilt rack library storage bin. The system includes activation means, movie selection means and a TV set at each subscriber location, an address mechanism in the system and a telephone connection through a duplex modem to a computer having a monitor and keyboard with computer controlling XYZ carrier movement pick up of cartridges from and return to video cassette storage bins, insertion and extraction of selected video cassettes to and from subscriber video cassette players (VCP). Each VCP has an audio and video output connection to respective modulators each output connected to a combiner mixer There is also a character-modulator loop connection, and a computer to combiner mixer address transmitter loop along with a character generator modulator loop, with the mixer output connected to address control circuits.

Specific embodiments representing what are presently regraded as the best modes of carrying out the invention are illustrated in the accompanying drawings.

Figure 1B:
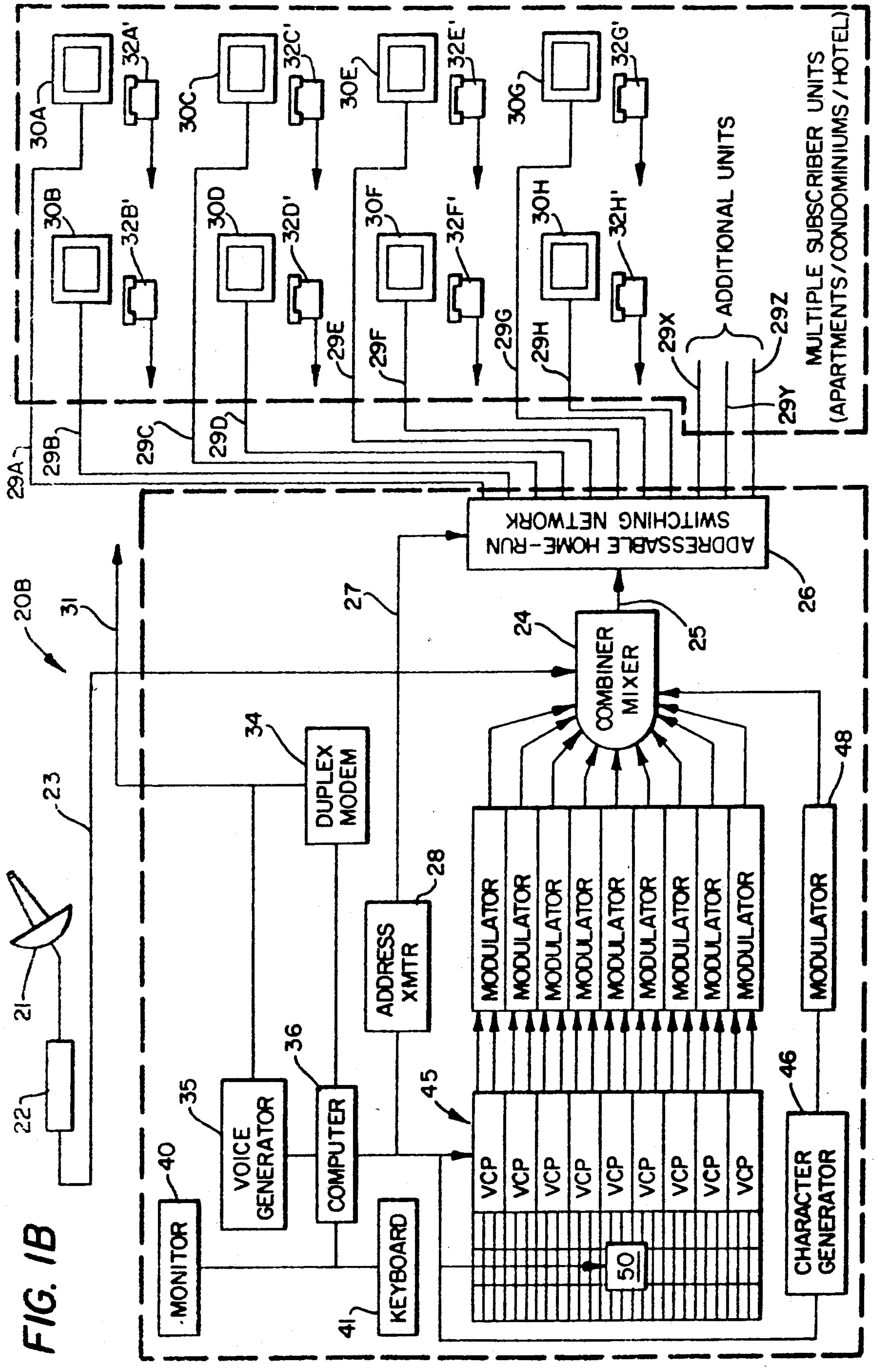
Figure 1C:
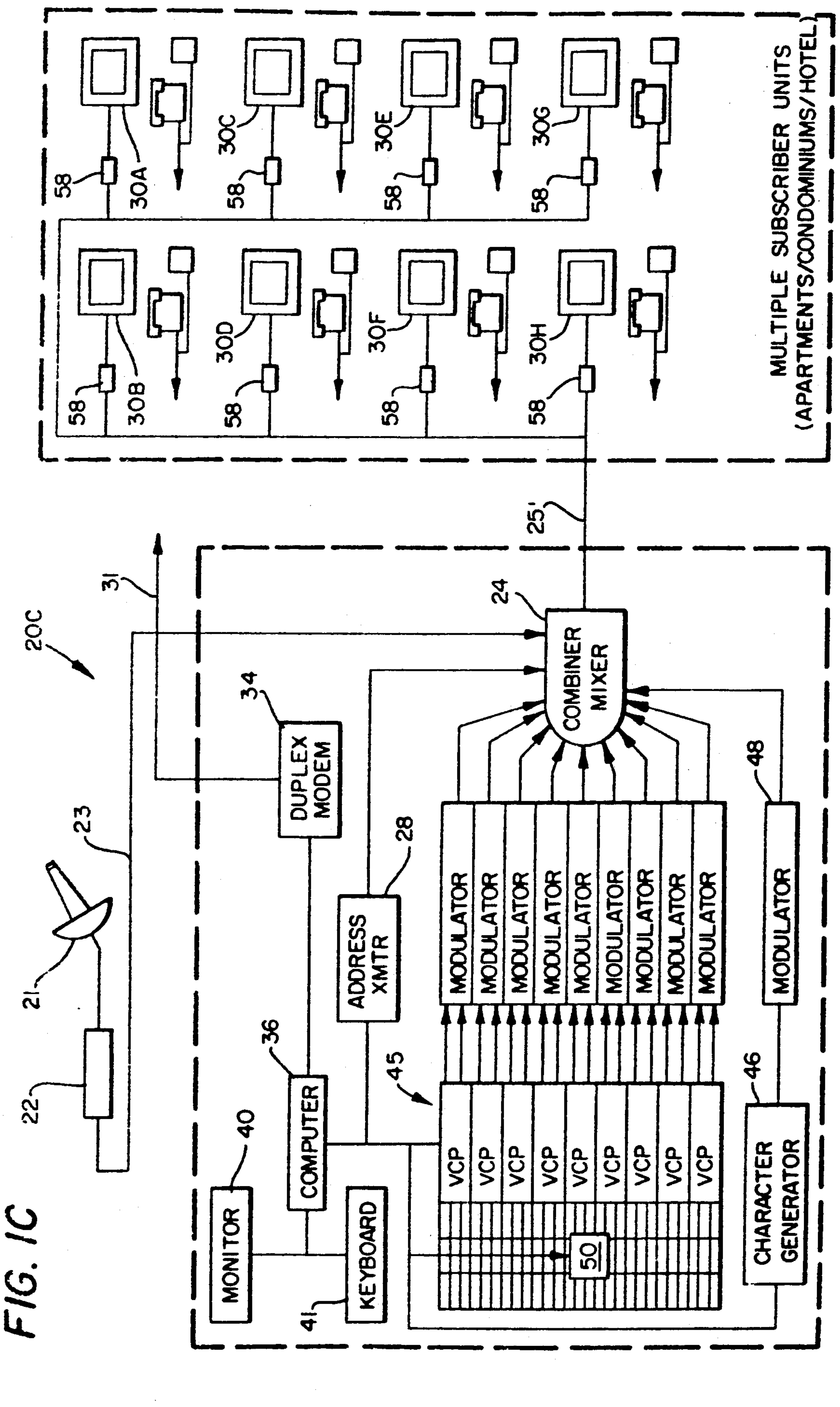
Figure 1D:
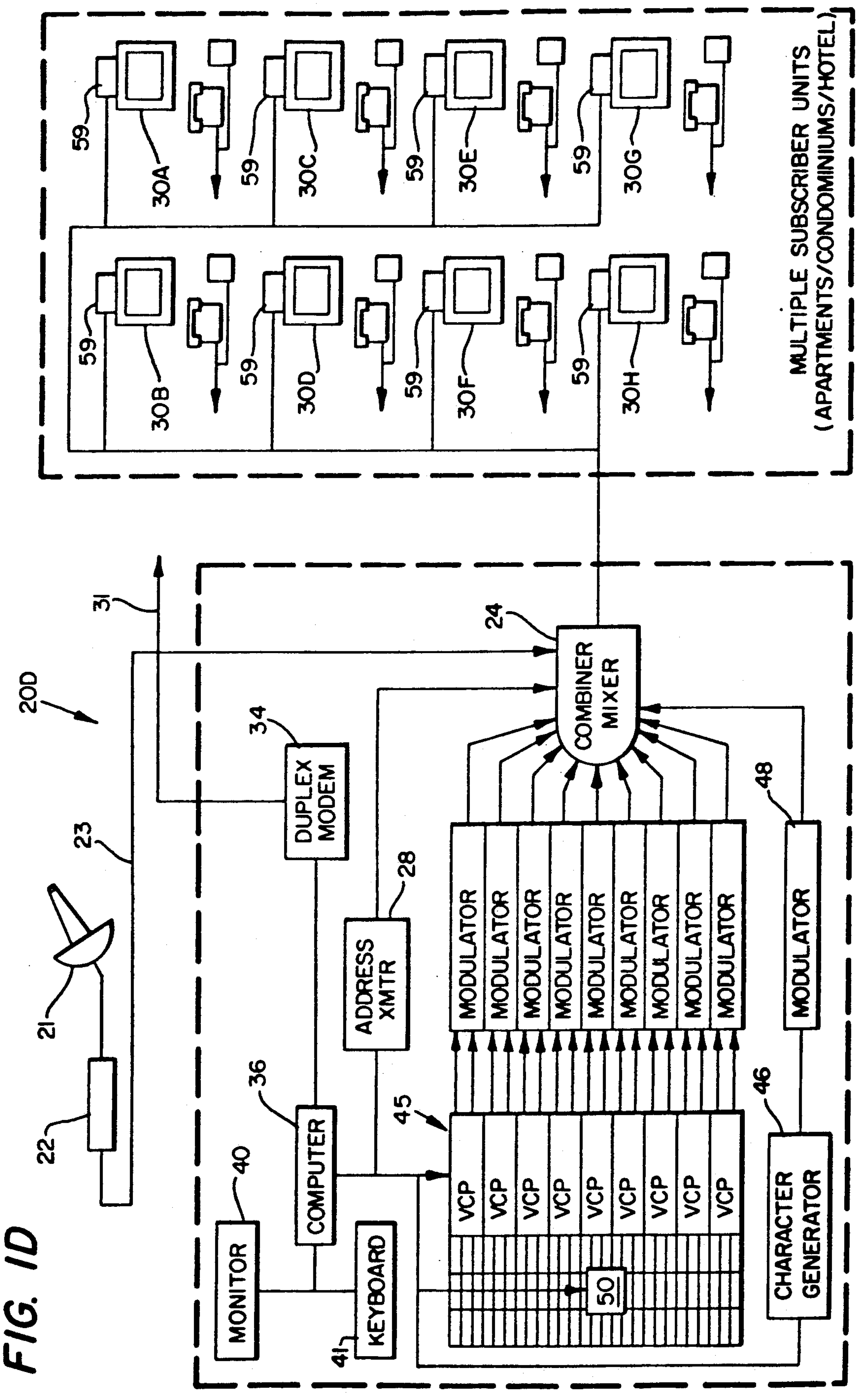
Figure 1E:
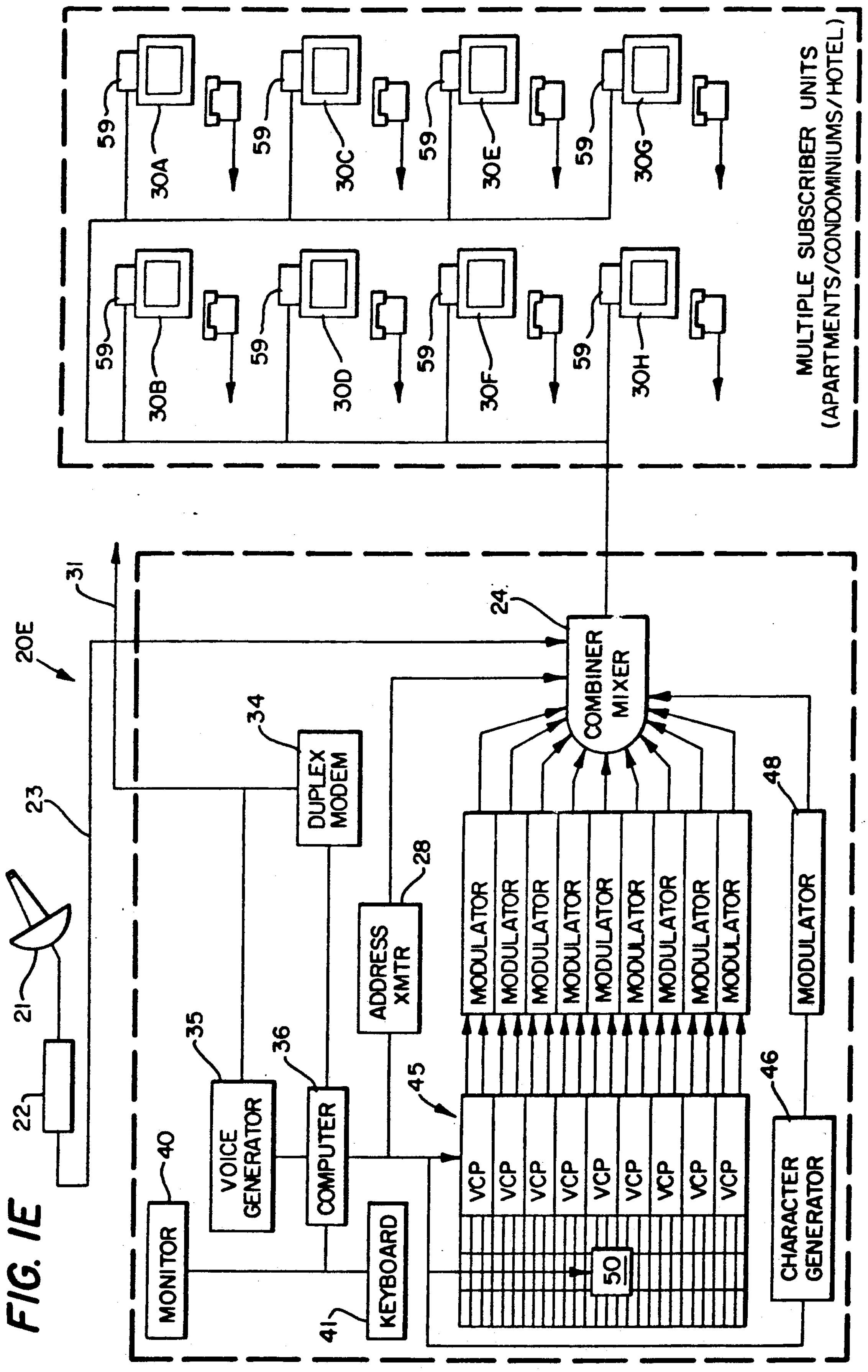
Figure 1F:
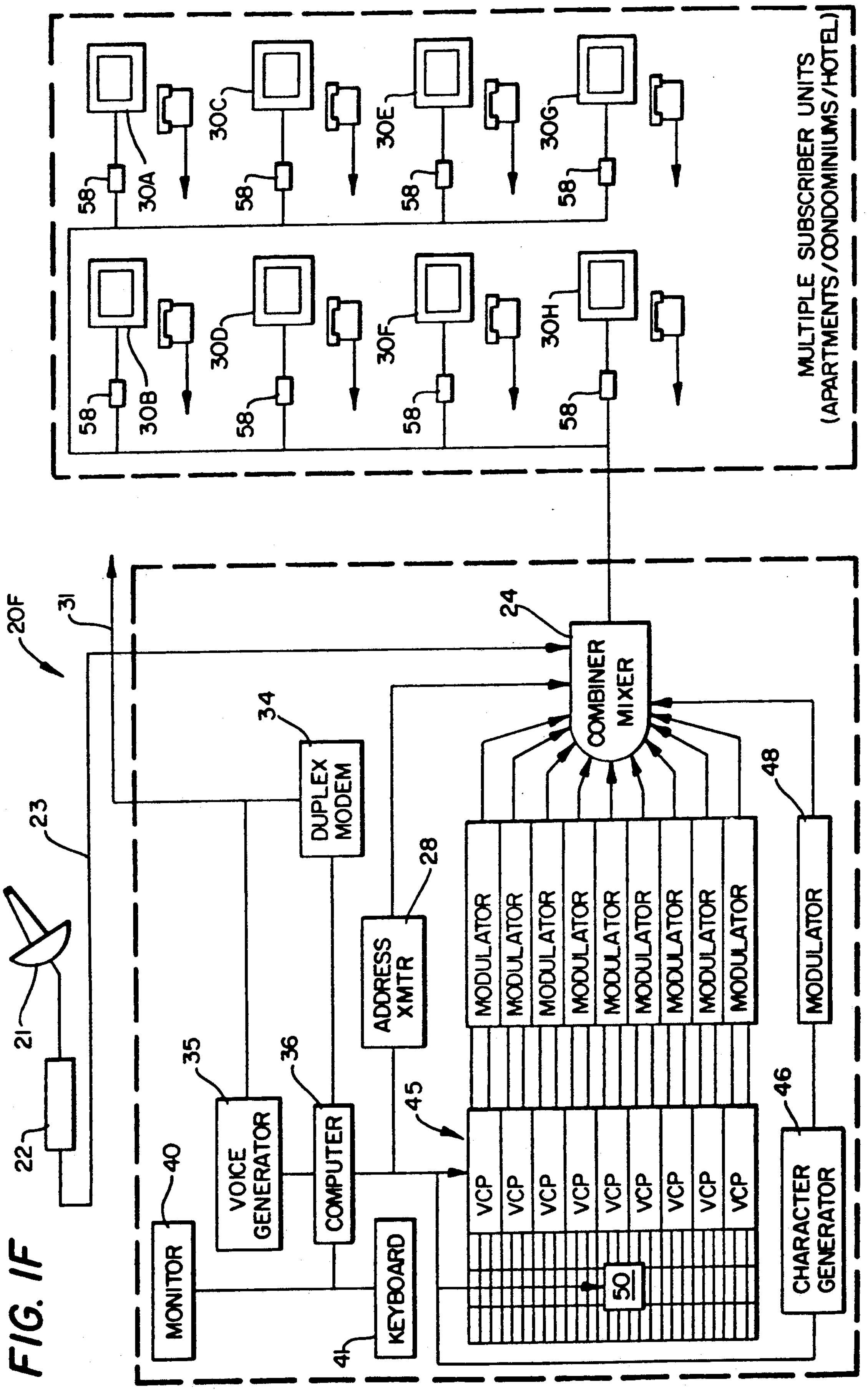
Figure 2:
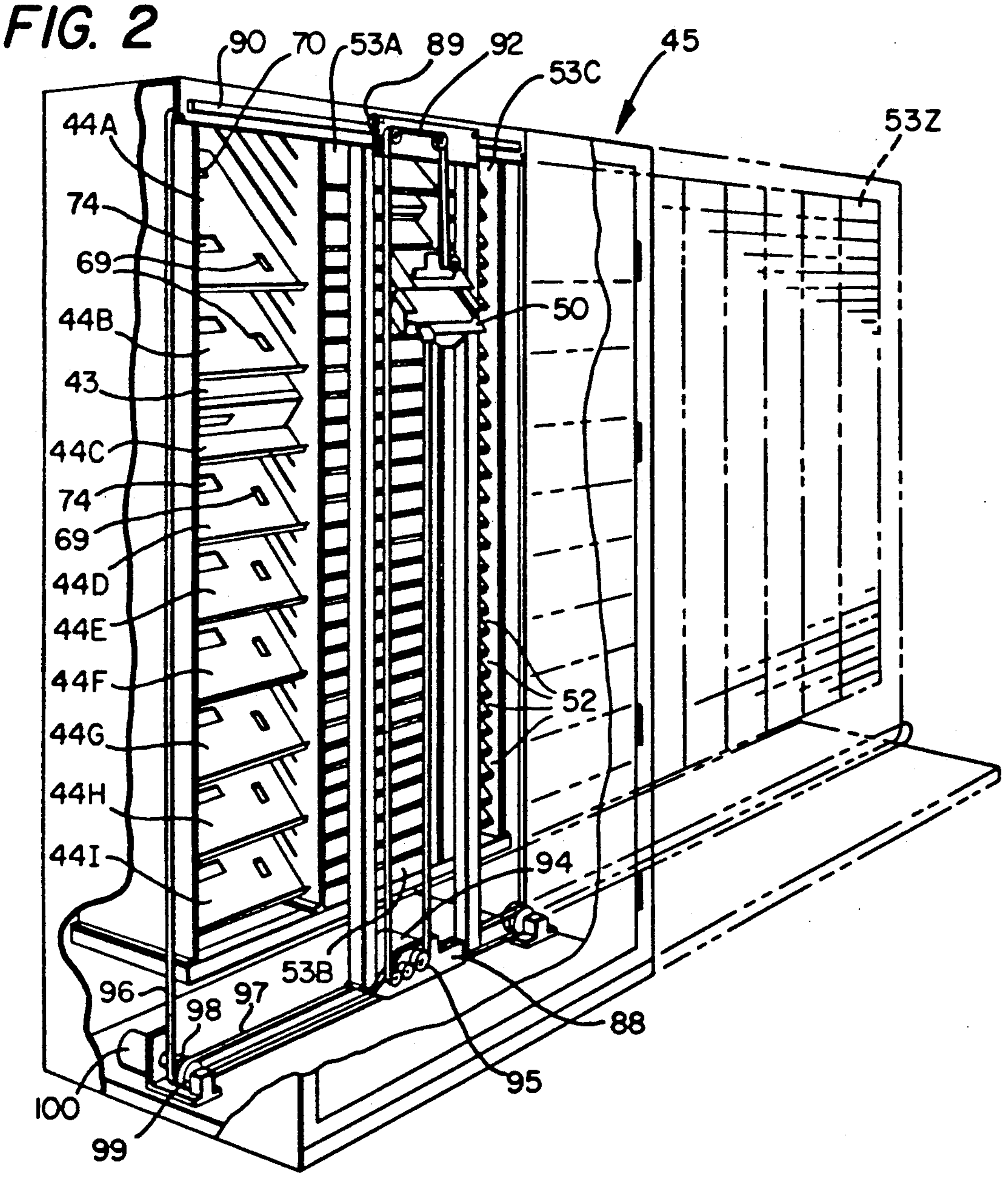
Figure 3:
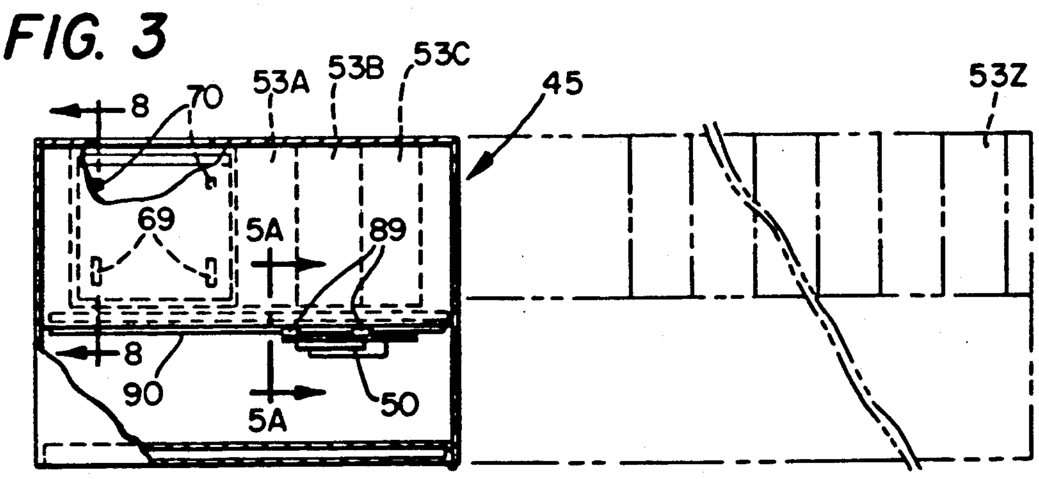
Figure 4:
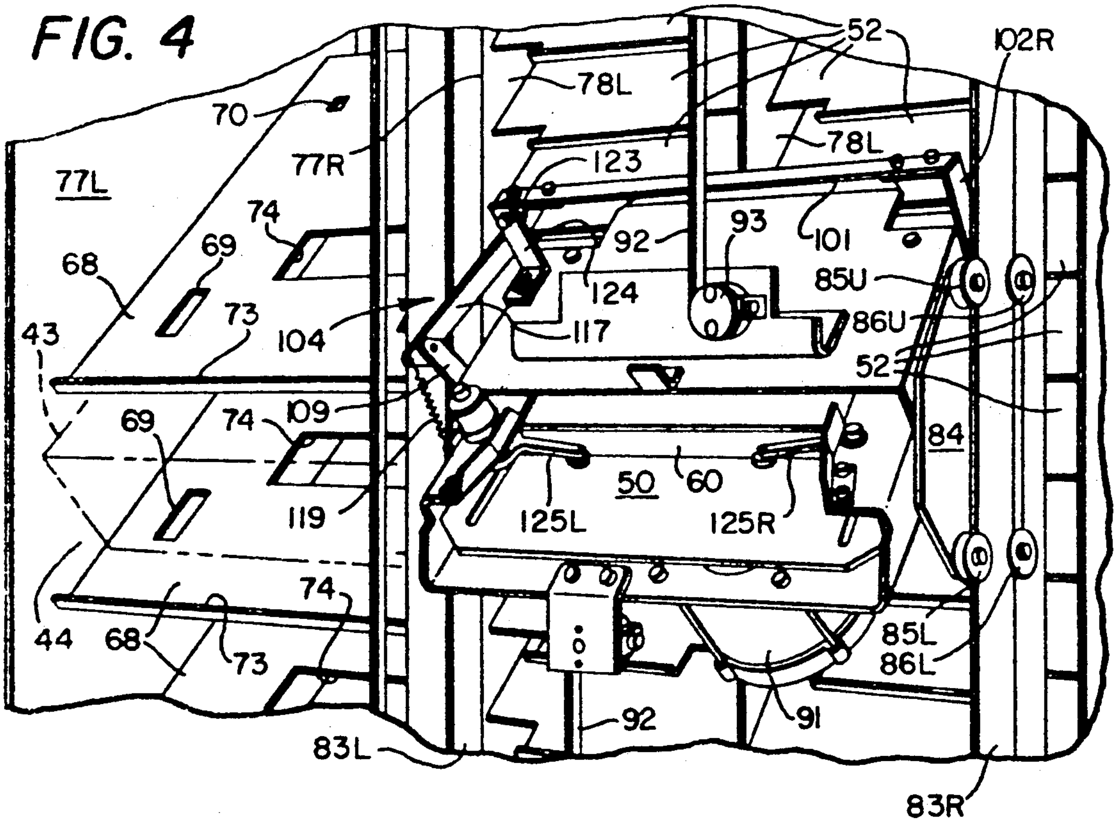
Figure 5A:
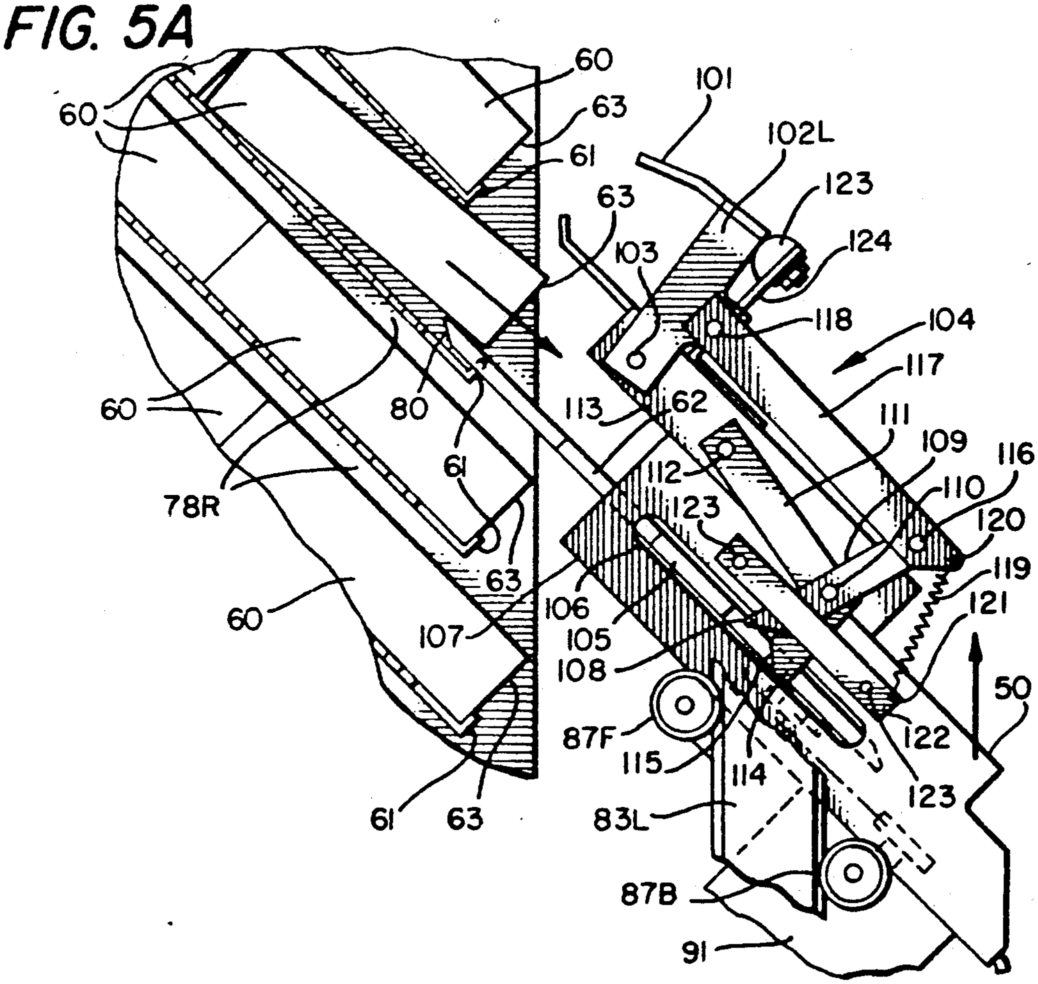
Figure 5B:
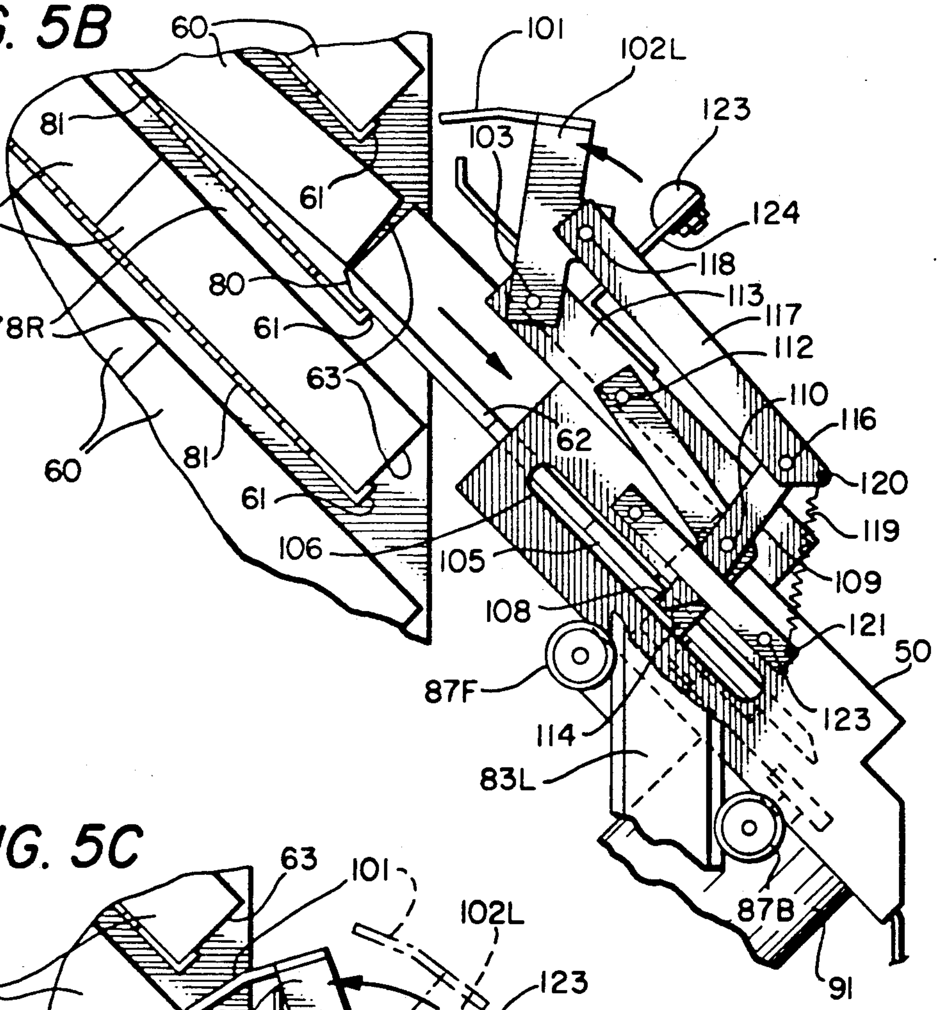
Figure 5C:
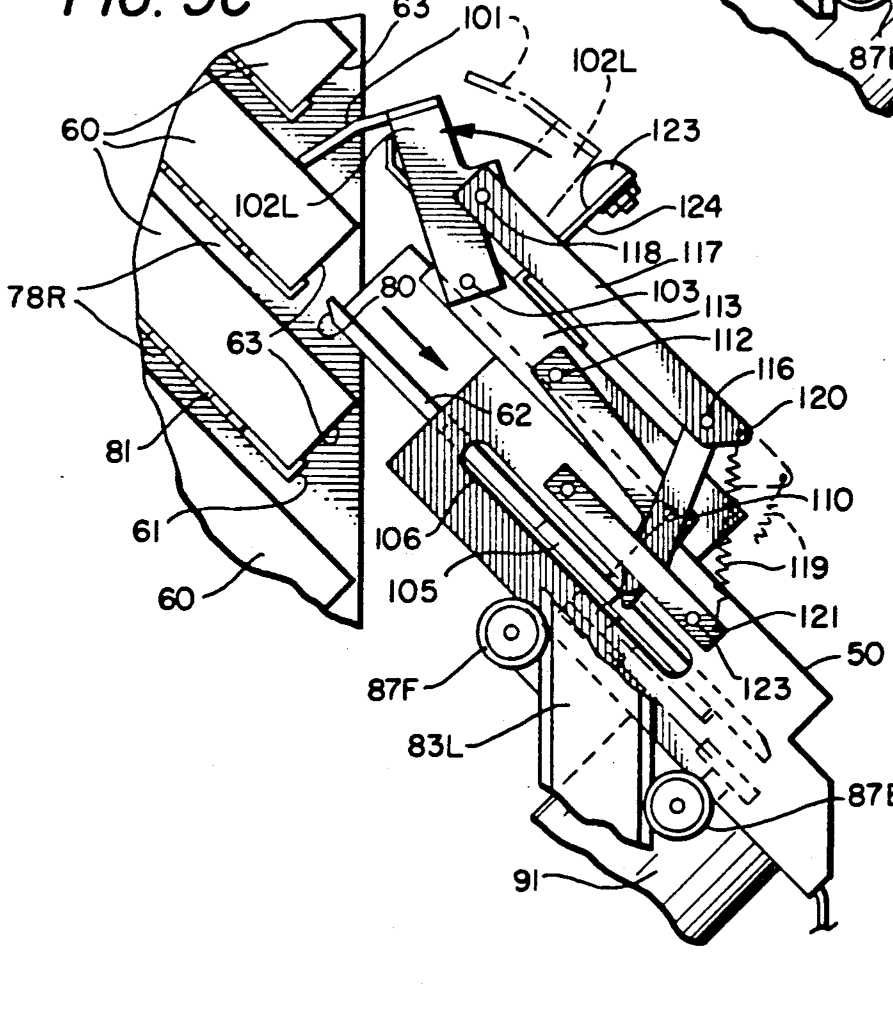
Figures 6, 7, 8, 9:
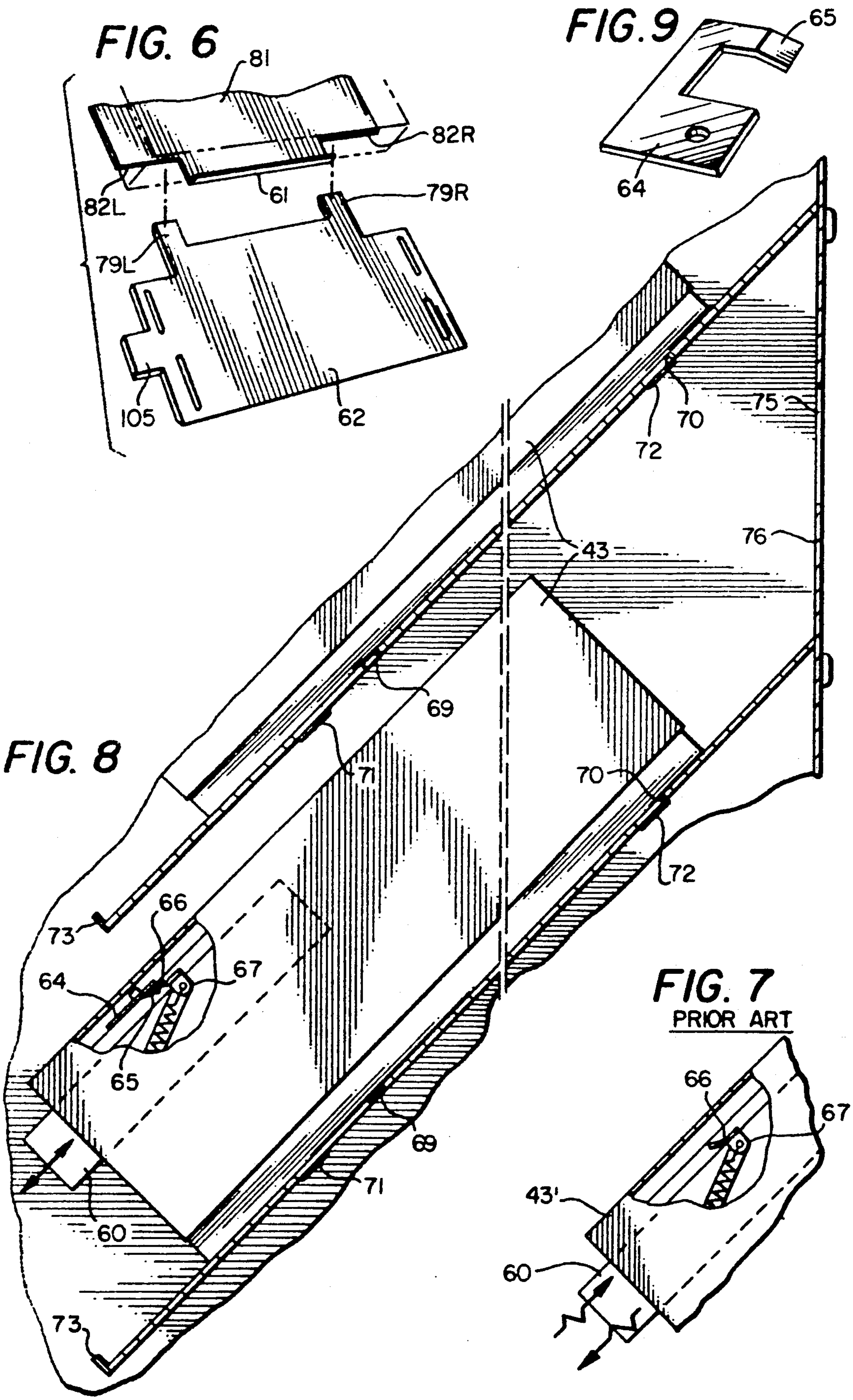
FIG. 7 PRIOR ART

In the drawings:

FIG. 1A represents a block schematic of a parallel (home run) wired facilty with telephone order entry box in a video cassette tilt bin library and video cassette tilt rack (cabinet) bin library with VCP to multiple television play subscriber system;

FIG. 1B, a block schematic like FIG. 1 of a parallel (home run) wired facility with telephone/voice response order entry system;

FIG. 1C, a block schematic of a system having a series (loop) wired facility with addressable switch and telephone order entry boxes;

FIG. 1D, a block schematic of a system having a series (loop) wired facility with set-top addressable converters and telephone order entry boxes;

FIG. 1E, a block schematic of a system having a series (loop) wired facility with set-top addressable converters and telephone voice response entry;

FIG. 1F, a block schematic of a system having a series (loop) wired facility with addressable switches and telephone voice response order entry;

FIG. 2, a perspective view of a self contained tilt rack video cassette library cabinet with multiple VCP unit bins and multiple video cassette tilt storage bins in vertical columns and a XYZ carrier that picks up cartridges, delivering them to available VCP units and after use return them to respective video cassette tilt storage bins;

FIG. 3, a top plan view partially cut away and sectioned showing additional detail of the self contained tilt rack video cassette library cabinet of FIG. 2;

FIG. 4, a partial cut away perspective view showing VCP mounting bins and some cassette storage bins and some XYZ cassette carrier mechanism detail;

FIG. 5A, a partial cut away and sectioned view taken from line *5A*—*5A* of FIG. 3 showing XYZ video cassette carrier mechanism detail and bin detail;

FIGS. 5B and 5C, partial views showing additional XYZ cassette carrier mechanism detail including different positions of a cassette position tap down linkage structure;

FIG. 6, a partial perspective showing of a XYZ movement video cassette pick up and movement plate as related to the front bottom of a cassette storage bin;

FIG. 7, a partial view partially cut away and sectioned of a prior art video cassette player showing detail of a hold structure;

FIG. 8, a partial broken away and sectioned view of a VCP mounted in place in a VCP tilt rack bin with cassette friction hold release detail;

FIG. 9, a friction hold release plate addition to video cassette players.

Referring to the drawings:

The cable TV systems 20A-F of FIGS. 1A-F are shown to have a TV signal receiving antenna 21 feeding an amplifier section 22 having an output line 23 connection to a signal combiner mixer circuit 24. The output line 25 of the combiner mixer circuits 24 in FIGS. 20A and 20B are shown to each be output connected to an addressable home-run switching network 26 with network 26 also receiving an input through line 27 from address transmitter circuit 28. The output lines 29A-Z (or cables) from addressable home-run switching network 26 are connected to a plurality of television sets 30A-H plus that are positioned at multiple subscriber unit locations in apartments, condomiums and/or hotels. Cable (or line) 31 has branch connections 31A-H to telephones 32A-H and in the system embodiment 20A of FIG. 1A also on to the movie selector key board units 33A-H on the subscriber side, and on the control movie selection and playing side cable 31 is connected to a duplex modem circuit 34 and a voice generator circuit 35 for generation of voice responses to the subscriber telephones 32A-H. The duplex modem circuit 34 is connected to computer 36 through line 38. Computer 36 is also connected through line 39 with branches 39A and 39B to monitor circuit 40 and keyboard 41, respectively. Computer 36 output line 42 is connected to the video cassette players 43, that are held in tilted VCP bins 44A-I in a lilt rack video cassette library cabinet 45, through branch 42A to address transmitter circuit 28 and through branch 42B to character generator circuit 46. The output line 47 of circuit 46 is connected to a modulation circuit 48 that is output connected through line 49 to combiner mixer 24. There is also a branch 42C from computer line 42 that extends to XYZ cassette carrier mechanism 50.

The tilt rack video cassette library cabinet 45 with multiple VCP unit bins 44A-I, or more, and multiple video cassette tilt storage bins 52 in vertical columns 53A-Z and XYZ carrier 50 that under computer 36 direction picks up video cassette cartridges delivering them to available VCP units and then, after use, returning them to respective video cassette tilt storage bins 52. Each VCP unit 43 has two output lines 54 and 55 connected as inputs to respective modulator circuits 56 that have output lines 57 to combiner mixer circuit 24. The tilt rack video cassette library system with multiple VCP units mounted in bins and multiple video movie cassettes stored in tilt storage bins and at least one XYZ carrier under computer direction to pick up video cassette cartridges in response to subscriber selection and delivers them to available VCP units is at the heart of the various video subscriber select TV movie play system embodiments of FIGS. 1A-F.

With the subscriber select TV movie play system embodiment of FIG. 1B the difference from the FIG. 1A embodiment is that the movie selector key board units 33A-H of FIG. 1A are omitted with movie selection accomplished via phones 32A'-H'.

The FIG. 1C system embodiment having a series (loop) wired facility with addressable switch and telephone order entry boxes differs from the FIG. 1A system embodiment in that the voice generator circuit 35 of FIG. 1A is omitted along with addressable home-run switching network 26. The combiner mixer circuit 24 output line 25' is connected to a plurality of addressable switch (TYP) units 58 each connected to a respective subscriber television set 30A-30H.

The FIG. 1D system embodiment has a series (loop) wired facility with set-top addressable converters 59 in place of the addressable switch (TYP) units 58 of the FIG. 1C system embodiment but is otherwise the same.

The FIG. 1E system embodiment having a series (loop) wired facility with set top addressable converters 59 like the FIG. 1D system embodiment also employs a voice generator 35 like in the FIG. 1B embodiment.

The FIG. 1F system embodiment has a series (loop) wired facility with addressable switch units 58 like the embodiment of FIG. 1C also and telephones 32A'-H' like the embodiment of FIG. 1B feeding back to duplex modem circuit 34 and voice generator circuit 35 with communication back and forth there between.

Referring now to the combination video cassette tilt bin library rack and video cassette player tilt bin rack cabinet 45 as shown in FIGS. 2, 3 and 4 and also to FIGS. 5A-C for further detail of the XYZ video cassette carrier mechanism 50 picking video cassettes 60 from respective video cassette 60 tilt storage bins 52 that are generally tilted at an angle approximating forty five degrees down toward the front video cassette retaining lip 61. The video cassette tilt storage bins 52 may be tilted at an angle in the range of approximately forty degrees to sixty degrees so that the video cassettes 60 slide down toward the front of tilt storage bins 52 until stopped by video cassette retaining lip 61. The bins 52 may retain two video cassettes in the uppermost bin 52 to as much as five or more cassettes per library storage bin 52. It should be noted that the XYZ video cassette carrier mechanism 50 is tilted at substantially the same angle as the tilt angle of the tilt storage bins 52 in order to pick up video cassettes 60 and holding them at the same tilt angle while being carried by the XYZ mechanism 50 for delivery to an available VCP 43 mounted at the same tilt angle in a tilted VCP bin 44A-I in the tilt rack video cassette library cabinet 45. Further, as shown in phantom in FIGS. 2 and 3 tilt rack video cassette library 45 could be extended to much greater size with more video cassette tilt bin storage capacity, more VCP tilt mounting rack bins 44 in an additional vertical column or more of rack bins 44, and possibly an additional xyz video cassette carrier mechanism 50 or more to meet expanded system requirements.

Referring also to FIG. 6 the XYZ video cassette carrier mechanism 50 is equipped with a video cassette pickup plate 62 that is moveable from a retracted position to an extended position beneath the forward edge 63 of a video cassette 60 and then upward to lift the forward facing edge 63 above the top of the front video cassette retaining lip 61 so that the cassette 60 is free to slide down into the XYZ video cassette carrying state from the state of FIG. 5A to the state of FIGS. 5B and 5C. The selected video cassette 60 is carried by the XYZ carrier mechanism 50 to an available VCP 43 and inserted therein as indicated in FIG. 8. A standard prior art VCP 43' as shown in FIG. 7 is altered with a cassette 60 friction hold release plate 64 of FIG. 9 mounted therein with a downwardly angled tab 65 thereon that is engaged by an opposite matingly angled tab 66 of friction hold structure 67 and thereby release a cassette 60 from friction hold as it is moved toward the release state so that it moves outward to XYZ carrier mechanism 50 for return to its specific tilt rack cassette 60 storage bin 52.

The VCP unit bins 44 as shown in FIGS. 4 and 8 each have a tilted bottom 68 with openings 69 and 70 therein receiving feet 71 and 2 therein to hold a VCP in place and has an upturned lip 73 at the lower front to retain a VCP 43 if the feet 71 and 72 thereof had not entered the bottom openings 69 and 70. The tilted bottoms 68 also have a vent opening 74, and each VCP bin also has a rear vent opening 75 in rear wall 76 of the rack 45. The transverse spacing of the opposite side walls 77L and 77R of VCP bins 44 is substantially twice the transverse spacing of the opposite side walls 78L and 78R of cassette storage bins 52.

Referring again to FIGS. 4, 5A–C and 6 the video cassette pick up plate 62 is provided with two forwardly extended opposite side projections 79L and 79R, having leading edge bottom bevels 80, that are moved forward to beneath the forward portion of a video cassette 60. Opposite sides of the bottom plate 81 of each video cassette storage bin 52, that is also the top of the bin 52 there below, is provided with cut out sections 82L and 82R that also shortens the retaining lip 61 from each end in each bin 52. This provides clearance for projections 79L and 79R of pick up plate 62 in its operation of being moved forward for projections 79L and 79R to extend under the forward edge of a selected cassette 60 lifting it up to clear the top of the bin 52 retaining lip 61 for the cassette 60 to slide into the XYZ carrier mechanism 50. The XYZ carrier mechanism 50 is mounted for vertical Y movement up and down along left and right vertical rail members 83L and 83R with carriage flange 84 mounted grooved wheels 85U and L and 86U and L riding along opposite edges of rail member 83R, and with carriage mounted grooved wheels 87F and 87B riding along opposite edges of rail member 83L. Rail members 83L and 83R are part of an X direction moveable frame 88 suspended from the top with grooved wheels 89 that roll along top rail 90. A Z direction in and out power drive unit 91 is mounted on XYZ carrier mechanism 50 that drives video cassette pickup plate 62 in and out and through its various cassette 60 lifting and other movements as initiated by computer 36 direction. Movement of the carrier mechanism 50 up and down in the Y direction is accomplished by cleated drive belt 92, that has an upper end fastened to anchor member 93 mounted on the top of carrier mechanism 50 and a lower end fastened in like manner to the bottom of carrier mechanism 50, as driven by motor 94 and cleated drive pulley 95 as directed by computer 36. Transverse X direction movement of frame 88 and carrier mechanism 50 is accomplished by two belts 96 and 97, one having opposite ends connected to the top of frame 88 and the other having opposite ends connected to the bottom of frame 88, as driven by cleated drive pulleys 98 and 99 both driven in common by drive motor 100 as control directed by computer 36.

The XYZ carrier mechanism 50 has a pivotally mounted cassette 60 tap down blade 101 mounted on opposite end pivot arms 102L and 102R pivoted about mounting pins 103 that is operated to tap a following cassette 60 down, as the leading cassette is being removed, for proper retention by bin lip 61. There is a compound lever structure 104 that drives the cassette tap down blade 101 cyclically each time a cassette 60 is picked up by the carrier mechanism 50. The video cassette pickup plate 62 is provided with a left side projection 105 that extends through slot 106 in left side carrier side plate 107 that in rearward motion engages the bottom front 108 of a lever member 109 pivot pin 110 mounted on a pivot member 111 mounted by a pivot pin 112 at the upper innermost end to a side plate 113, generally coplaner with side plate 107, and that has a depending arm 114 with ramp cam surface 115 at the bottom. Lever member 109 is pivot pin 116 connected to the rear end of link member 117 that is pivot pin 118 connected at the forward end thereof to pivot arm 102L for pivotal movement thereof and downward tapping of cassette tap down blade 101. A return tension spring 119 is connected between opening 120 in the rear end of link member 117 and opening 121 in the rear end of alignment strap 122 rivet 123 (or bolt) mounted in spaced relation to side plate 107 maintaining alignment of the compound lever structure 104. The bottom front 108 of lever member 109 is engaged by the rear edge of the left side projection 105 of cassette pickup plate 62 as it is moved to the rear. Then with continued rearward motion of plate 62 and projection 105 the lever member 109 is pivoted about its pivot pin 110 mounting and the compound lever structure is driven through its sequential states from FIG. 5A through 5C driving the tap down blade 101 through its cassette tap down action. Thereafter with continued rearward motion of plate 62 projection 105 moves into contact with ramp cam surface 115 that rides up on projection 105 raising pivot member 111 and much of compound lever structure 104 higher including lever member 109. Then as bottom front 108 clears the rear of projection 105 the resilient force of spring 119 returns the compound lever structure 104 to the tap down blade 101 retracted state like shown in FIG. 5A with pivot arm 102L in contact with return limit bumper 123 mounted by bracket 124 on the top of the carrier mechanism 50. At this time the bottom of lever 109 is resting on the top of projection 105 and the ramp cam surface 115 and pivot member 111 have ridden up on projection 105. When projection 105 is moved forward, as plate 62 is moved forward in the next cycle of operation, and clears the ramp cam surface 115 of pivot member 111 and the bottom of lever member 109 they fall down to the state of FIG. 5A ready for another operational tap down cycle. Arms 125L and 125R are part of the cassette 60 holding and ejecting mechanism of XYZ cassette carrier mechanism 50.

Whereas this invention has been described with respect to a single embodiment thereof, it should be realized that various changes may be made without departure from the essential contributions to the art made by the teachings hereof.

I claim:

1. A tilt bin rack video tape cassette library for a television program transmission system feeding video to a plurality of user television sets from video cassette players comprising: multiple tilt bin racks having a plurality of tilt cassette bins and a plurality of tilt cassette player bins for mounting of video cassette players; and XYZ motion cassette carrier mechanism having computer connection means for video tape cassette selection and delivery under computer control directing insertion into an available video cassette player to play to a user television set and return after play to a designated tilt cassette bin; and a video signal circuit connection means for connecting said video cassette players playing selected video tape cassettes each to a specific user television set; wherein said plurality of tilt cassette bins and said plurality of tilt cassette player bins are tilted at substantially the same angle from high back to low front in the range of approximately forty degrees to sixty degrees so that said video tape cassettes slide down under the force of gravity toward the front of said plurality of tilt cassette bins; each tilt cassette bin is provided with a lower front upwardly extending retaining lip from each tilt cassette bin bottom; said each tilt cassette bin has a bottom, a top and opposite side walls; and with the bottom of most of said plurality of tilt cassette bins being the top for the tilt cassette bin immediately there below; said XYZ motion cassette carrier mechanism receives and holds said video tape cassette from said plurality of tilt cassette bins at substantially the same tilt angle as said plurality of tilt cassette bins and said plurality of tilt cassette player bins for optimized video tape cassette pickup from said plurality of tilt cassette bins, delivery to an available vide cassette player, pickup extraction form said video cassette player, and return to the tilt cassette bin of origin; said XYZ motion cassette carrier mechanism is mounted for up and down Y direction movement in a carriage having vertical side rails along which said XYZ motion cassette carrier mechanism is moved, said carriage being mounted for transverse horizontal movement back and forth in the X direction form alignment with said plurality of tile cassette bins to alignment with said plurality of cassette player bins and back to alignment with said plurality of tilt cassette bins; wherein said XYZ motion cassette carrier mechanism is provided with a video cassette pickup plate moveable back and forth in the Z direction for pickup of said video tape cassette from said plurality of tilt cassette bins; said each tilt cassette bin bottom has opposite side form cut out sections including shortening of said tilt cassette bin retaining lip from each end; said video cassette pickup plate having two forwardly extended opposite side projections that with forward movement of the pickup plate extend under a front edge of a selected video tape cassette and when raised through an area of said front cut out sections lift the selected video tape cassette up to clear the top of the tilted cassette bin retaining lip for the video tape cassette to slide into the XYZ motion cassette carrier mechanism.

2. The tilt bin rack video tape cassette library of claim 1, wherein said plurality of tilt cassette bins are in a first area of said multiple tilt bin racks; and said plurality of tilt cassette player bins are in a second area of said multiple tilt bin racks.

3. The tilt bin rack video tape cassette library of claim 2, wherein said plurality of tilt cassette bins are in a plurality of vertical columns of bins; and said plurality of tilt cassette player bins are in at least one vertical column of bins.

4. The tilt bin rack video tape cassette library of claim 3, wherein said plurality of tilt cassette player bins are both wider and higher top to bottom than said plurality of tilt cassette bins.

5. The tilt bin rack video cassette library of claim 1, wherein said XYZ motion cassette carrier mechanism includes Z direction video cassette ejection means for insertion of the video tape cassette into said video cassette player, and back into said tilt cassette bin.

6. The tilt bin rack video cassette library of claim 5, wherein said plurality of cassette player bins have opposite side walls spaced wider than the opposite side walls of said plurality of tilt cassette bins, and having bottom to top spacing greater than bottom to top spacing of said plurality of tilt cassette bins.

7. The tilt bin rack video cassette library of claim 6, wherein said plurality of tilt cassette player bins have a back wall; vent opening means in said back wall; and vent opening means in the bottoms and tops of said video cassette player bins; bin openings sized and placed to receive mounting feet provided on the bottoms of said video cassette players and an upturned lip on the bottom front to retain said video cassette player if said mounting feet thereof had not entered the said bin openings.

8. The tilt bin rack video cassette library of claim 7, wherein a transverse spacing of the opposite side walls of said plurality of tilt cassette player bins is approximately twice the spacing of the opposite side walls of said plurality of tilt cassette bins; and the top to bottom spacing of said plurality of tilt cassette player bins is generally three times the top to bottom spacing of said plurality of tilt cassette bins.

9. The tilt bin rack video cassette library of claim 5, wherein said video cassette players are modified to include cassette friction hold release means positioned for cassette cartridge friction hold release as said video tape cassette is moved toward ejection within said video cassette player.

10. The tilt bin rack video cassette library of claim 9, wherein said cassette friction hold release means includes friction hold structure; and a downwardly angled tab mounted in said video cassette players positioned to be engaged by an opposite matingly angled tab part of said friction hold structure and thereby release said video tape cassette from friction hold as it is moved toward a release state.

11. The tilt bin rack video cassette library of claim 1, wherein said XYZ motion cassette carrier mechanism carries a pivotally mounted cassette tap down structure operated to tap a following video tape cassette down as an adjacent leading video tape cassette is being removed for bin retention of the following video tape cassette by said lower front upwardly extending retaining lip; and drive means driving said pivotally mounted cassette tap down structure with each cycle of video tape cassette movement operation of said XYZ motion cassette carrier mechanism.

12. The tilt bin rack video cassette library of claim 11, wherein said drive means driven said pivotally mounted cassette tap down structure includes, compound lever means driving said pivotally mounted cassette tap down structure; and compound lever engaging means on said video cassette pick up plate engaging said compound lever engaging means with each backward movement stroke of said video cassette pick up plate for driving said compound lever engaging means and said pivotally mounted cassette tap down structure in its tap down movement.

13. The tilt bin rack video cassette library of claim 12, wherein said compound lever engaging means on said video cassette pick up plate is a side projection.

14. The tilt bin rack video cassette library of claim 13, wherein said compound lever engaging means includes a first lever member pivotally mounted to a second lever member in turn pivotally mounted on frame means of said XYZ motion cassette carrier mechanism; said second lever member having a depending arm with a ramp cam surface at the bottom; said first lever member being pivotally connected at its top to a rear end of a link member pivotally connected at a forward end thereof to said pivotally mounted cassette tap down structure for driving said pivotally mounted tap down structure in its tap down movement with each backward movement stroke of said video cassette pick up plate and said side projection of the pick up plate.

15. The tilt bin rack video cassette library of claim 14, wherein resilient tension spring means is connected between said link member and frame means of said XYZ motion cassette carrier mechanism for returning said compound lever engaging means and said pivotally mounted tap down structure to a retracted state.

16. The tilt bin rack video cassette library of claim 15, wherein said first lever member has a bottom front positioned to be engaged by a rear edge of said side projection as said video cassette pickup plate and said side projection are being moved at a downward angle away form the tilt cassette bin continued downward angled motion thereof said first lever member is pivoted about its pivotal mounting and said compound lever engaging means is driven for tap down drive of said pivotally mounted cassette tap down structure; said ramp cam surface on the bottom of said second lever member is in position to be engaged by the rear edge of said side projection and driven upwardly with continued rearward movement of said side projection; said bottom front is carrier upward with said ramp cam surface induced upward motion imposed on said compound lever engaging means carries said first lever member upward to a position where said first lever member bottom from clears the rear edge of said side projection permitting said resilient tension spring means to return said compound lever engaging mens to the retracted state.

17. The tilt bin rack video cassette library of claim 16, wherein with forward movement of said video cassette pick up plate and said side projection in the next cycle of operation as said side projection moves out from under the said ramp cam surface of said second lever member and then out from under the bottom of said first lever member and said compound lever engaging means is lowered into position for the next cycle of cassette tap down operation.

18. The tilt bin rack video tape cassette library for a television program transmission system feeding video to a plurality of user television sets from video cassette players comprising: multiple tilt bin racks having a plurality of tilt cassette bins and a plurality of tilt cassette player bins for mounting of video cassette players; an XYZ motion cassette carrier mechanism having computer connection means for video tape cassette selection and delivery under computer control directing insertion into an available video cassette player to play to a user television set and return after play to a designated tilt cassette bin; and a video signal circuit connection means for connecting said video cassette players playing selected video tape cassettes each to a specific user television set; wherein said plurality of tilt cassette bins and said plurality of tilt cassette player bins are tilted at substantially the same angle from high back to low front as approximately forty five degrees so that said video cassette tapes slide down under the force of gravity toward the front of said plurality of tilt cassette bins where an upturned lip on the bottom of each tilt cassette bin restrains said video tape cassette in respective bins from further movement downward.

19. The tilt bin rack video cassette library of claim 18, wherein said multiple tilt bin racks are extended with more than on area serviced by said XYZ motion cassette carrier mechanism specific to respective areas of the video tape cassette library.

20. The tilt bin rack video cassette library of claim 18, wherein said multiple tilt bin racks are enclosed within a cabinet.

21. In a television program transmission system feeding video to a plurality of user television sets, a video cassette player to television set communication system comprising: multiple tilt cassette bin racks with a plurality of multiple tilt cassette bins each having multiple cassette carrying capacity; a plurality of tilt cassette player bins containing a plurality of video cassette players; and XYZ motion cassette carrier mechanism for video tape cassette selection and delivery, under computer control directing insertion into an available video cassette player to play to a user television set, and return after play to a designated tilt cassette bin; computer control means connected to said XYZ motion cassette carrier mechanism; video signal circuit means interconnecting said plurality of video cassette players playing selected video cassette tapes each to a specific user television set; and a user locating program selecting means connected to said computer control means.

22. The video cassette player to television set communication system of claim 21, wherein said user location program selecting means includes telephone order entry box means connected via telephone line means to said computer control means.

23. The video cassette player to television set communication system of claim 21, wherein said user location program selecting means includes telephone voice response means connected to user location telephones also connected by telephone line means to and through a duplex modem to said computer control means.

* * * * *